United States Patent
Maeda

(10) Patent No.: US 8,009,314 B2
(45) Date of Patent: Aug. 30, 2011

(54) IMAGE PROCESSING APPARATUS IMAGE PROCESSING METHOD, AND A COMPUTER-READABLE NON-TRANSITORY STORAGE MEDIUM FOR CAUSING A RECORDING APPARATUS TO RECORD AN IMAGE

(75) Inventor: Masao Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1204 days.

(21) Appl. No.: 11/671,110

(22) Filed: Feb. 5, 2007

(65) Prior Publication Data

US 2007/0188806 A1 Aug. 16, 2007

(30) Foreign Application Priority Data

Feb. 14, 2006 (JP) ................................. 2006-035917

(51) Int. Cl.
*G06F 3/12* (2006.01)
*H04N 1/04* (2006.01)

(52) U.S. Cl. ...................................... 358/1.16; 358/474

(58) Field of Classification Search ................... 358/1.1, 358/1.8, 1.13, 1.14, 1.15, 1.16, 1.18, 296, 358/474, 524, 426.05, 426.06
See application file for complete search history.

(56) References Cited

U.S. PATENT DOCUMENTS

| | | | | |
|---|---|---|---|---|
| 5,317,416 A * | 5/1994 | Tsuboi et al. | ................. | 358/444 |
| 5,680,228 A * | 10/1997 | Kirmeier | ....................... | 358/474 |
| 5,724,490 A * | 3/1998 | Shibaki et al. | ................ | 358/1.15 |
| 5,877,864 A * | 3/1999 | Sumida et al. | ................ | 358/1.16 |
| 6,348,974 B1 * | 2/2002 | Takahashi et al. | ............ | 358/1.16 |
| 6,480,297 B1 * | 11/2002 | Suzuki et al. | ................ | 358/1.16 |
| 6,603,570 B2 * | 8/2003 | Asahi | ............................ | 358/1.15 |
| 6,943,912 B1 * | 9/2005 | Kamei et al. | ................. | 358/1.16 |
| 2004/0049608 A1 * | 3/2004 | Sakurai | ............................. | 710/5 |
| 2005/0117177 A1 * | 6/2005 | Niitsuma | ..................... | 358/1.15 |

FOREIGN PATENT DOCUMENTS

| | | |
|---|---|---|
| JP | 11-331457 A | 11/1999 |
| JP | 2003-087467 A | 3/2003 |

* cited by examiner

*Primary Examiner* — Gabriel I Garcia

(74) *Attorney, Agent, or Firm* — Canon USA Inc IP Division

(57) ABSTRACT

In a copy operation for a first sheet of requested plural sheets, a reading unit reads a document and a data conversion section converts the document image data into recording data. A recording unit records the recording data, while the recording data is stored in an image memory. A data amount of recording data to be stored in the image memory is determined. If, when a copy operation for a first sheet is completed, all of recording data is incapable of being stored in the image memory and the determined data amount of recording data is equal to or smaller than an available storage capacity of the image memory on condition that a read operation and a record operation are separately executed, a residual sheet record operation is executed by separately executing the read operation and the record operation.

11 Claims, 9 Drawing Sheets

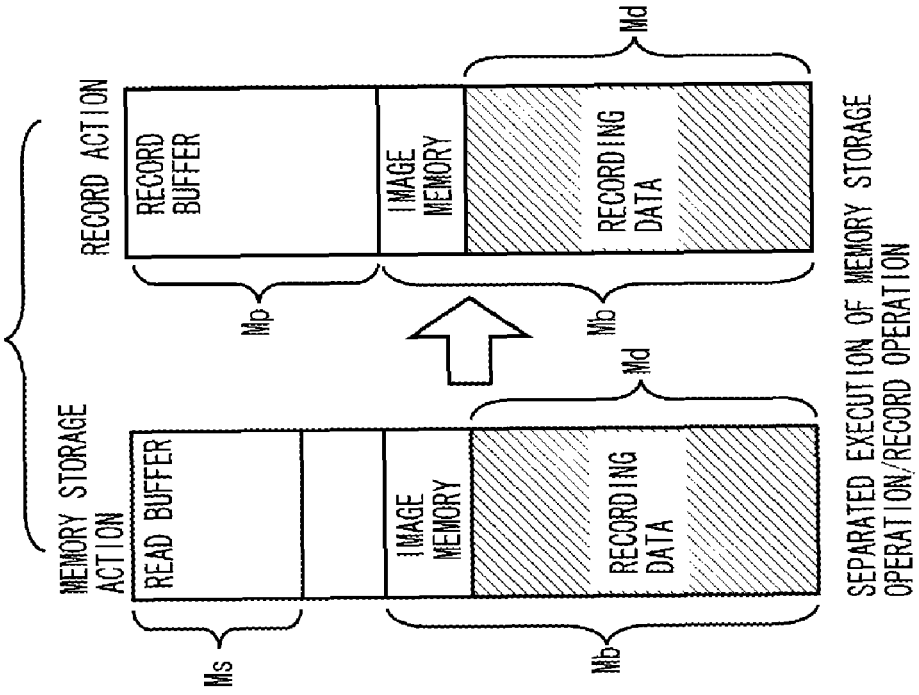
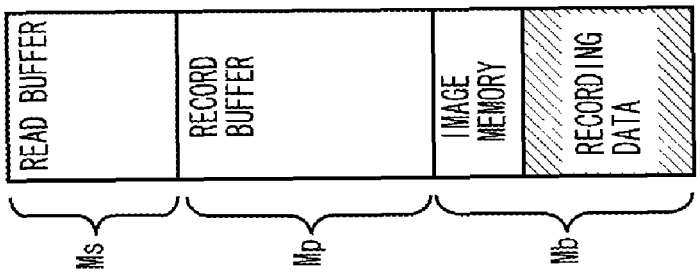
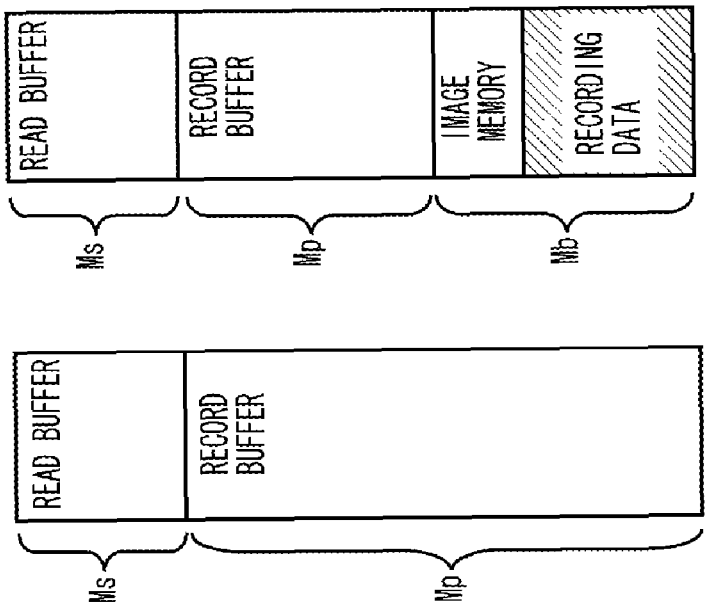

IMAGE PROCESSING APPARATUS IMAGE PROCESSING METHOD, AND A COMPUTER-READABLE NON-TRANSITORY STORAGE MEDIUM FOR CAUSING A RECORDING APPARATUS TO RECORD AN IMAGE

BACKGROUND OF THE INVENTION

1. Field of the Invention

The present invention relates to a method for controlling an image forming apparatus, a program for controlling an image forming apparatus, and an image forming apparatus.

2. Description of the Related Art

An image forming apparatus, such as a digital copying machine or a multifunction (all-in-one) printer, has a function of scanning/reading a document and a function of recording document image data on a recording sheet.

For example, an image forming apparatus scans/reads a document and successively converts document image data into recording data. Then, the image forming apparatus transfers the recording data to a printer for printing. If the number of required copies is plural, the above-mentioned sequential processing of the image forming apparatus is repeated plural times for one document to be copied.

However, repeatedly executing a scan/read operation for each sheet takes a long time to accomplish the entire copy operation for the requested number of copies. To solve this problem, document image data read in a copy operation for the first sheet can be stored in an image memory while being recorded on the sheet by a printer. The printer can execute a succeeding copy operation for residual sheets based on the image data stored in the image memory.

For example, as discussed in Japanese Patent Application Laid-Open No. 11-331457, a copy operation for printing plural sheets from the same document includes sequential processes of scanning/reading a document, compressing read image data, storing compressed image data into an image memory, reading compressed image data from the image memory, expanding the compressed image data, and transferring the expanded image data to a printer. According to the above-mentioned copy operation, succeeding sheets can be speedily printed and a memory capacity of the image memory required for the processing can be relatively small.

However, a compression format of image data may not be effective for every image data characteristics. Therefore, expected data compression effects may not be obtained if the compression format does not match the characteristics of image data.

For example, when data compression/expansion processing is required for inputting/outputting image data to/from an image memory, compression effects may vary depending on the contents of a document. Computation resources used for compression/expansion processing may be useless.

Furthermore, as discussed in Japanese Patent Application Laid-Open No. 2003-087467, compressed image data may not be completely stored in an image memory depending on the contents of a document. In this case, a succeeding copy operation for residual sheets cannot be carried out. The requested copy operation for plural sheets ends in failure. As a result, the succeeding copy operation method is forcibly changed to a method including processes of repeatedly executing a scan/read operation for each sheet.

To improve the copy quality, a scanner with a higher resolution is required to scan/read a document and a printer with a higher resolution is required to record the document image.

To this end, an image forming apparatus is equipped with a large-scale read buffer memory and a large-scale record buffer memory.

On the other hand, due to a wide-spread use of digital copying machines and multifunction (all-in-one) printers, the cost of each machine has been decreasing. The capacity of a memory installable on each machine is limited to a lower capacity and expected to realize advanced functions.

In other words, a limited memory capacity is shared by an image memory, a read buffer memory, and a record buffer memory. In particular, the image memory stores compressed image data. If an available memory capacity is small, securing a sufficient capacity for the image memory may be difficult.

For example, in a copy operation for plural sheets, a memory capacity available for an image memory tends to become smaller. Thus, compressed image data for one page may not be completely stored in the image memory.

According to the above-mentioned conventional arrangement, if a memory overflow occurs in a first copy operation, the succeeding copy operation for residual sheets is stopped or performed by repeatedly executing a scan/read operation for each sheet with a decreased throughput.

SUMMARY OF THE INVENTION

Exemplary embodiments of the present invention are directed to a technique capable of realizing high-speed and low-cost copy processing and also capable of realizing higher performances of a printer even if the printer and an associated scanner have higher resolutions.

According to an aspect of the present invention, an image processing apparatus includes: a reading unit configured to read a document image and generate read data; a storage unit including a read buffer, an image memory, and a record buffer, the read buffer configured to temporarily store the read data received from the reading unit; a conversion unit configured to convert the read data stored in the read buffer into recording data and compressed recording data, the record buffer configured to temporarily store the recording data, the image memory configured to store the compressed recording data; a determining unit configured to determine a data amount of the compressed recording data to be stored in the image memory when a copy operation for plural sheets for a one-page document is executed; a recording unit configured to record the recording data; and a control unit configured to, if, when a copy operation for a first sheet is completed, all of compressed recording data for one page converted by the conversion unit is incapable of being stored in the image memory and the determined data amount is equal to or smaller than a difference between a memory capacity of the storage unit and a memory capacity of one of the read buffer or the record buffer, execute a first copy operation based on the compressed recording data stored in the image memory by separately performing a read operation by the reading unit and a record operation by the recording unit.

According to another aspect of the present invention, a method is provided for controlling an image processing apparatus. The method includes: reading a document image to generate read data; converting the read data into recording data and compressed recording data; storing the compressed recording data into an image memory; determining a data amount of the compressed recording data to be stored in the image memory when a copy operation for plural sheets for a one-page document is executed; recording the recording data; and if, when a copy operation for a first sheet is completed, all of compressed recording data for one page is incapable of being stored in the image memory and the determined data amount is equal to or smaller than a difference between (A) a memory capacity of one of a read buffer configured to temporarily store read data or a record buffer configured to temporarily store recording data and (B) a memory capacity of all of the image memory, the read buffer, and the record buffer, executing a first copy operation based on the compressed recording data stored in the image memory by separately performing the read operation and the record operation.

According to an exemplary embodiment of the present invention, when a copy operation for a first sheet is completed, it is determined whether all of recording data for one page cannot be stored in a storage unit and a counted data amount of the recording data is equal to or smaller than an available storage capacity of the storage unit on condition that a read/storage operation and a record operation are separately executed. Namely, a succeeding copy operation for residual sheets is carried out based on the result of a determination whether the recording data can be stored in the storage unit if the read/storage operation and the record operation are separately executed.

Therefore, exemplary embodiments of the present invention can realize high-speed recording processing with a limited memory capacity. In short, exemplary embodiments of the present invention can increase a copy speed and reduce a cost for copy. Furthermore, even if a scanner and a printer have higher resolutions, the exemplary embodiments can realize expected higher performances of the printer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A to 7C illustrate exemplary memory allocation of the image forming apparatus shown in FIG. 1 according to an embodiment of the present invention.

DETAILED DESCRIPTION OF THE EMBODIMENTS

Figure 1:
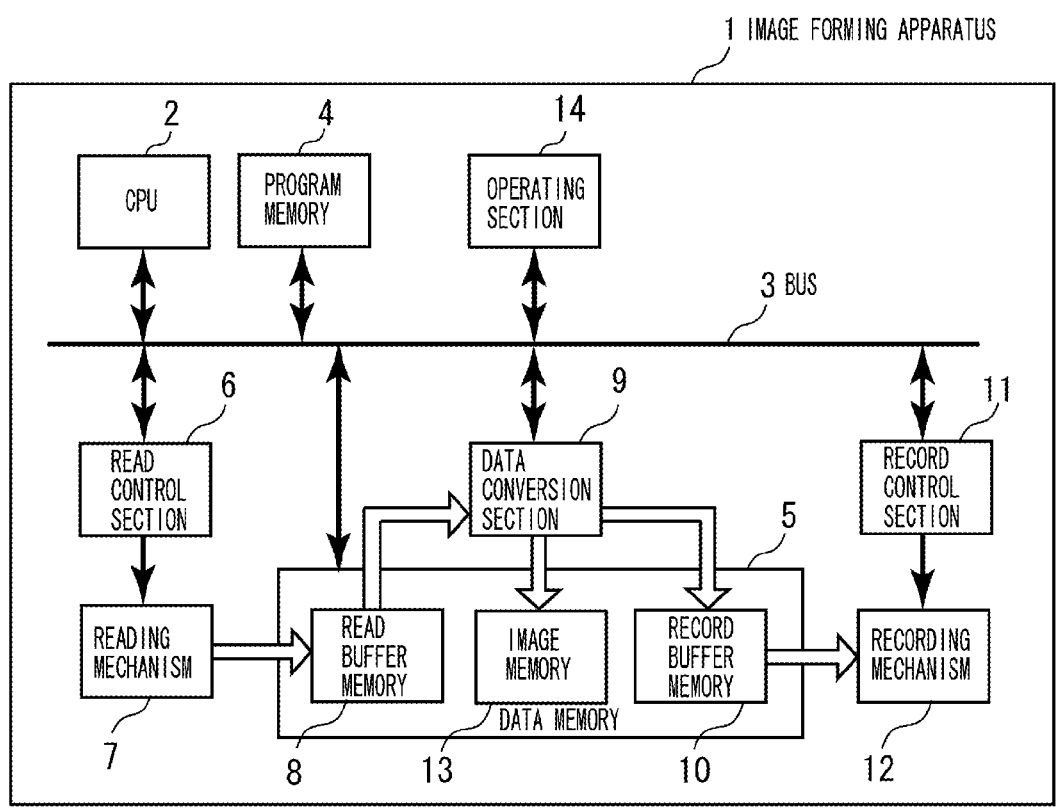
FIG. 1 is a block diagram illustrating an image forming apparatus according to an exemplary embodiment of the present invention.

The following description of exemplary embodiments is merely illustrative in nature and is in no way intended to limit the invention, its application, or uses.

Processes, techniques, apparatus, and systems as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings. Exemplary embodiments of the present invention are described based on an image forming apparatus equipped with a reading mechanism and a recording mechanism. The exemplary embodiments of the present invention are commonly applied to digital copying machines and multifunction printers.

First Exemplary Embodiment

FIG. 1 illustrates an image forming apparatus 1 according to an exemplary embodiment of the present invention. The image forming apparatus 1 includes a central processing unit (CPU) 2, a program memory 4, and a data memory 5, which are connected via an internal bus 3. For example, the CPU 2 can be configured by a microprocessor. The program memory 4 can be configured by a read-only memory (ROM). The data memory 5 can be configured by a random access memory (RAM). The CPU 2 can execute a control program loaded from the program memory 4 based on data stored in the data memory 5.

The CPU 2 is also connected to a read control section 6 and a record control section 11 via the internal bus 3. The CPU 2 instructs the read control section 6 to control a scan/read operation of a reading mechanism 7. The reading mechanism 7 includes an image sensor (not shown) that can scan and read a document image and send document image data to the data memory 5. The data memory 5 includes a read buffer memory 8, a record buffer memory 10, and an image memory 13. The read buffer memory 8 can store document image data received from the reading mechanism 7.

The reading mechanism 7 includes flatbed image scanner or a combination of a flatbed image scanner and an automatic document feeder (ADF), such as the one equipped in a digital copying machine or a multifunction printer. The reading mechanism 7 can cause a shift motion of the image sensor (not shown) relative to a document, or vice versa, to scan a document image.

A data conversion section 9 can receive document image data from the read buffer memory 8 and convert the received document image data into recording data. The data memory 5 receives the recording data from the data conversion section 9 and stores the received recording data in the record buffer memory 10.

The CPU 2 instructs the record control section 11 to control a record operation of a recording mechanism 12. The CPU 2 reads recording data from the record buffer memory 10 and sends the recording data to the recording mechanism 12. The recording mechanism 12 executes a copy operation for printing the recording data on a recording medium.

The recording mechanism 12 includes a printer engine of an electrophotographic type, an inkjet type, or other recording type.

The data conversion section 9 can compress recording data. The image memory 13 can store the compressed recording data. The compressed recording data stored in the image memory 13 can be read and transferred to the record buffer memory 10 for recording.

The CPU 2 can manage memory allocation for each of the read buffer memory 8, the record buffer memory 10, and the image memory 13. More specifically, the CPU 2 can dynamically change the memory capacity of each memory in the data memory 5 depending on an operation status (e.g., an operation mode or user settings).

Furthermore, the image forming apparatus 1 includes an operating section 14 equipped with a display device (e.g., a light-emitting diode (LED) or a liquid crystal display (LCD)) and various keys. The operating section 14 enables a user to perform various input operations and confirm a displayed operation status.

Figure 2:
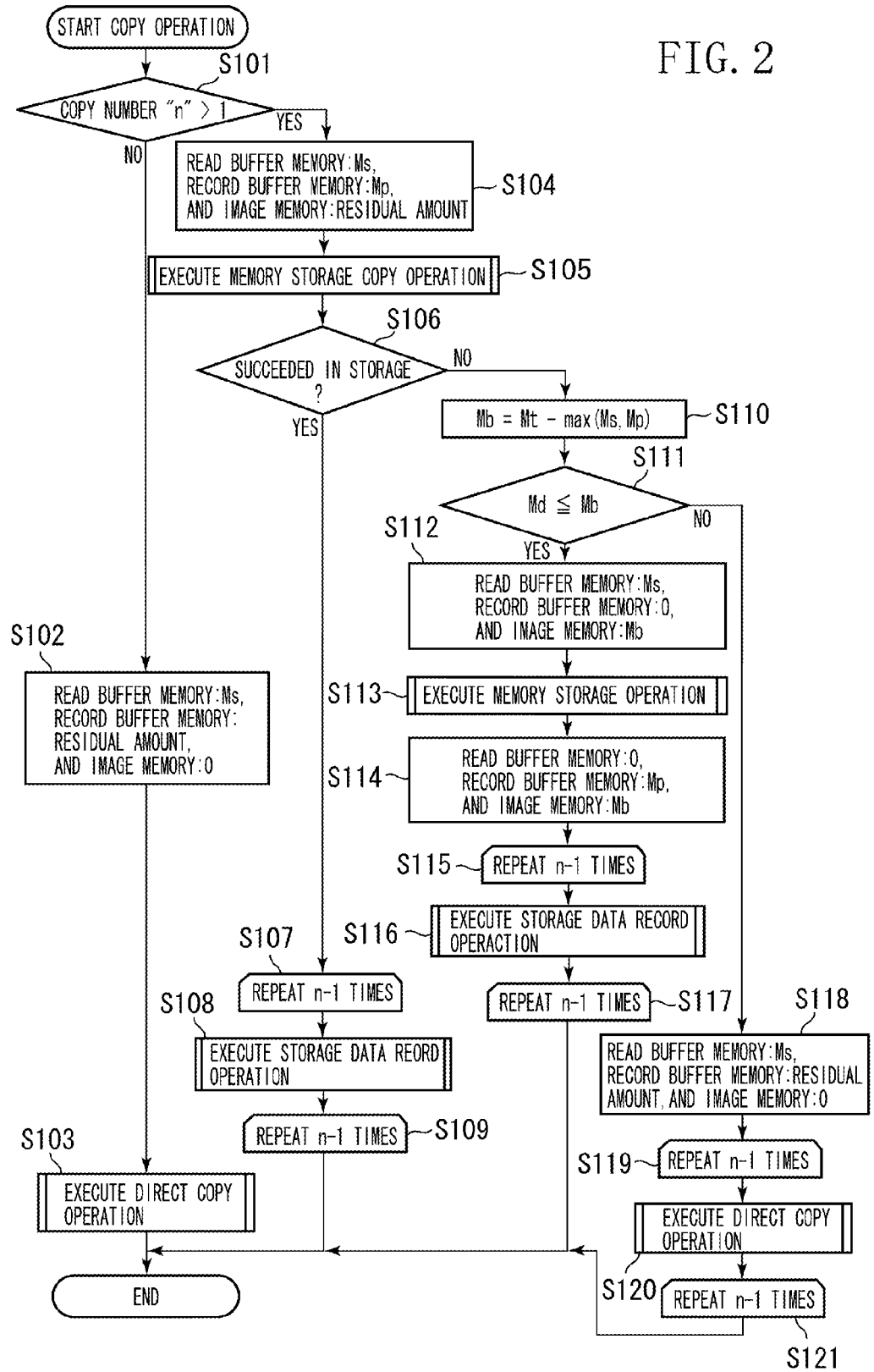
FIG. 2 is a flowchart illustrating an exemplary processing procedure for executing a copy operation of the image forming apparatus shown in FIG. 1 according to an embodiment of the present invention.

FIG. 2 is a flowchart illustrating an exemplary processing procedure for executing a copy operation of the image forming apparatus 1 according to an embodiment of the present invention.

In step S101, the CPU 2 checks whether the copy number "n" of required copies is not 1, i.e., whether the number in the copy settings is plural.

If the CPU 2 determines that the copy number "n" is 1 (i.e., NO in step S101), the processing flow proceeds to step S102. In step S102, the CPU 2 allocates a memory capacity Ms of the data memory 5 to the read buffer memory 8. The memory capacity Ms is equal to a memory capacity required for a scan/read operation in a presently set copy mode. The CPU 2 allocates a residual memory capacity of the data memory 5 to the record buffer memory 10. Then, the processing flow proceeds to step S103. In step S103, the CPU 2 executes a direct copy operation.

Figure 3:
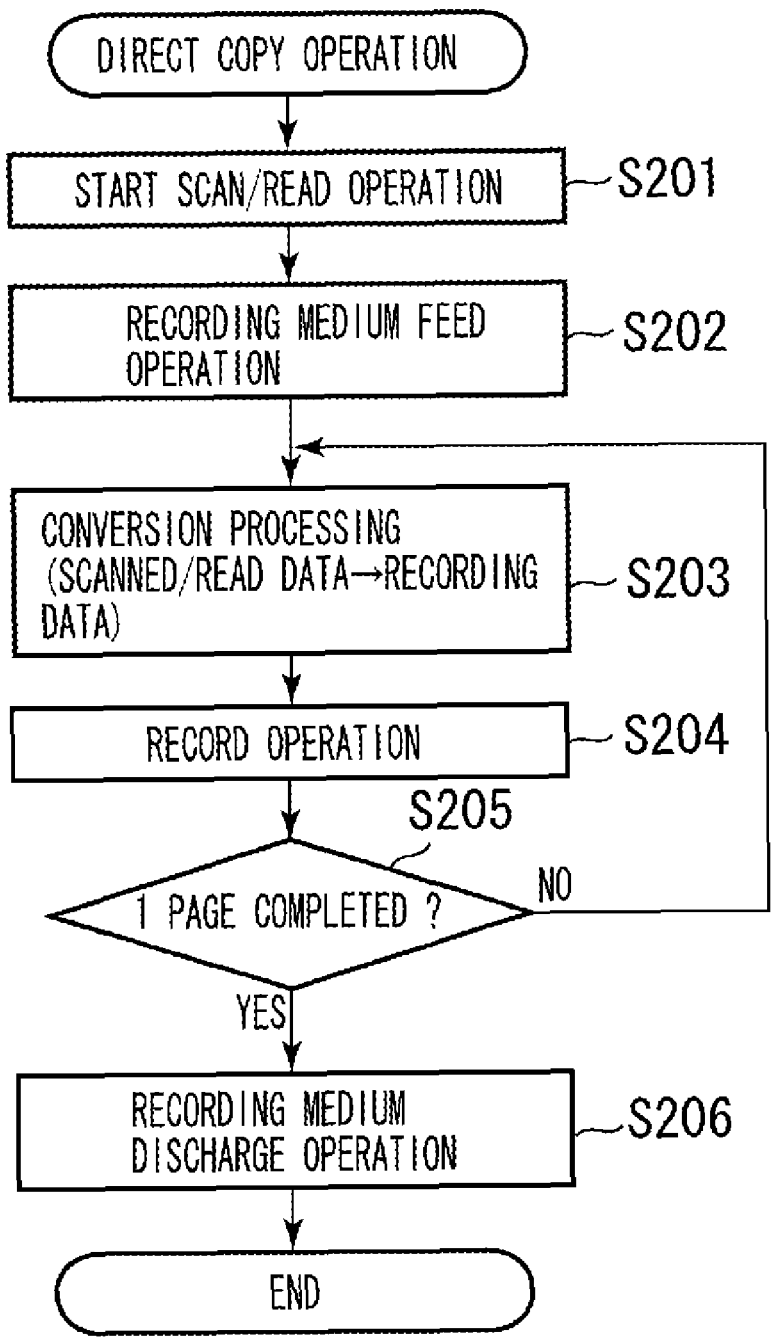
FIG. 3 is a flowchart illustrating an exemplary processing procedure for executing a direct copy operation of the image forming apparatus shown in FIG. 1 according to an embodiment of the present invention.

FIG. 3 is a flowchart illustrating an exemplary processing procedure for executing the direct copy operation (i.e., processing in step S103) of the image forming apparatus 1 according to an embodiment of the present invention. The direct copy operation includes a scan/read operation by the reading mechanism 7 and a record operation by the recording mechanism 12 based on converted data, which are executed in parallel.

First, the CPU 2 instructs the read control section 6 to start a scan/read operation of the reading mechanism 7 (refer to step S201). Furthermore, the CPU 2 instructs the record control section 11 to cause the recording mechanism 12 to execute a recording medium feed operation (refer to step S202).

Subsequently, in step S203, the CPU 2 instructs the data conversion section 9 to receive scanned/read data from the read buffer memory 8, which is sent from the reading mechanism 7, and successively convert the received scanned/read data into recording data. The record buffer memory 10 stores the recording data. The record control section 11 receives the recording data from the record buffer memory 10 for recording (refer to step S204).

Then, in step S205, the CPU 2 determines whether a copy operation for one page has been completed. If the copy operation for one page has not been completed (NO in step S205), the CPU 2 repeats the processing of steps S203 through S205. If the copy operation for one page has been completed (YES in step S205), the processing flow proceeds to step S206. In step S206, the CPU 2 causes the recording mechanism 12 to execute a recording medium discharge operation (refer to step S206). Then, the CPU 2 terminates a direct copy operation for one page.

On the other hand, if the copy number "n" is not 1, i.e., when the number in copy settings is plural (i.e., YES in step S101), the processing flow proceeds to step S104.

In step S104, the CPU 2 allocates a memory capacity Ms of the data memory 5 to the read buffer memory 8. As described above, the memory capacity Ms is equal to a memory capacity required for a scan/read operation in a presently set copy mode. Similarly, the CPU 2 allocates a memory capacity Mp of the data memory 5 to the record buffer memory 10. The memory capacity Mp is equal to a memory capacity required for a record operation in the presently set copy mode. Furthermore, the CPU 2 allocates a residual memory capacity of the data memory 5 to the image memory 13. Then, the processing flow proceeds to step S105. In step S105, the CPU 2 executes a memory storage copy operation.

Both the read buffer memory 8 and the record buffer memory 10 are configured to input/output non-compressed image data. The memory capacities Ms and Mp for these buffer memories can be determined based on a resolution and an image size in the copy mode.

Figure 4:
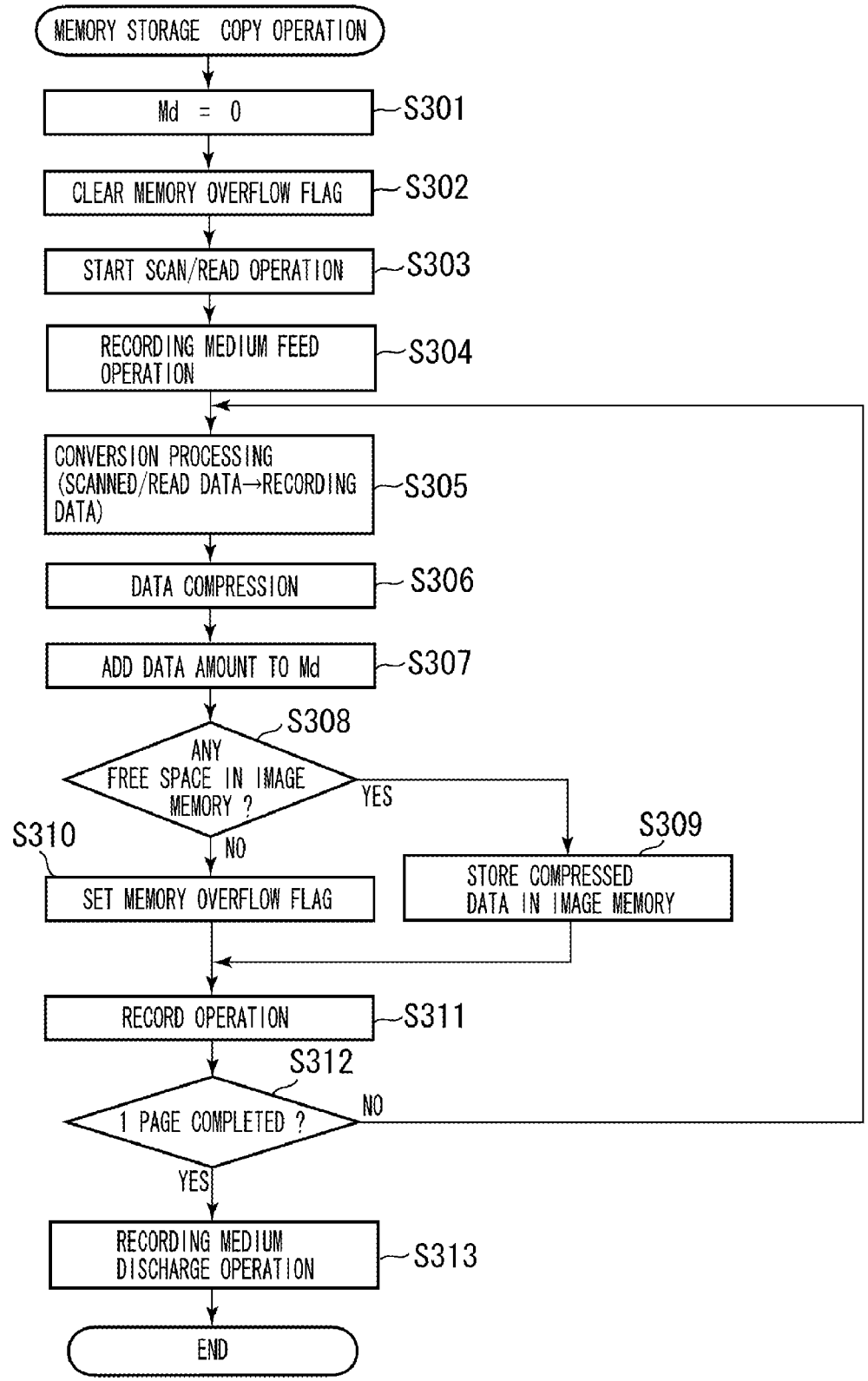
FIG. 4 is a flowchart illustrating an exemplary processing procedure for executing a memory storage copy operation of the image forming apparatus shown in FIG. 1 according to an embodiment of the present invention.

FIG. 4 is a flowchart illustrating an exemplary processing procedure for executing the memory storage copy operation (i.e., processing in step S105) of the image forming apparatus 1 according to an embodiment of the present invention. The memory storage copy operation includes a scan/read operation by the reading mechanism 7 and a record operation by the recording mechanism 12 based on converted data, which are executed in parallel, and also includes processes of compressing recording data and storing the compressed recording data into the image memory 13. As apparent from FIG. 2, the processing illustrated in FIG. 4 is performed in a copy operation for the first sheet of requested plural sheets.

First, before starting the memory storage copy operation, the CPU 2 clears a variable Md (i.e., Md=0) (refer to step S301). The variable Md is a count value of a data amount of compressed recording data to be stored in the image memory 13. Furthermore, the CPU 2 clears a memory overflow flag (refer to step S302).

Next, the CPU 2 instructs the read control section 6 to start a scan/read operation of the reading mechanism 7 (refer to step S303). Then, the CPU 2 instructs the record control section 11 to cause the recording mechanism 12 to execute a recording medium feed operation (refer to step S304).

Subsequently, the processing flow proceeds to step S305. In step S305, the CPU 2 instructs the data conversion section 9 to receive scanned/read data from the read buffer memory 8 and successively convert the scanned/read data into recording data. The record buffer memory 10 stores the recording data.

The data conversion section 9 converts the format of received scanned/read data into a data format transferable via the record buffer memory 10 to the recording mechanism 12. For example, the conversion processing includes conversion/ addition of a data delimiter, addition of a required data header, conversion of an endian, color conversion from RGB to CMYK, or dither processing and enhancement/filter processing corresponding to halftone images. In short, the conversion processing includes predetermined conversion processing to be executed between the scanned/read data format and the recording data format.

In step S306, the CPU 2 applies compression processing to the same recording data as recording data to be stored in the record buffer memory 10. Then, the CPU 2 adds the data amount of compressed data to the data amount counter Md (refer to step S307). Next, the CPU 2 determines whether the image memory 13 has a free space in which the compressed data can be stored (refer to step S308).

In the present exemplary embodiment, the data compression format applied to recording data can be an arbitrary data format. Furthermore, the compression format can be flexibly changed from a determined data format to another data format. Moreover, the compression format can be determined based on image characteristics (text/video/monochrome/color).

If there is a free space in the image memory 13 (i.e., YES in step S308), the CPU 2 stores the compressed data in the image memory 13 (refer to step S309). On the other hand, if there is no free space in the image memory 13 (i.e., NO in step S308), the CPU 2 sets a memory overflow flag (refer to step S310).

Subsequently, the processing flow proceeds to step S311. In step S311, the CPU 2 causes the record buffer memory 10 to transfer the recording data (stored in step S305) to the recording mechanism 12 for recording.

Then, in step S312, the CPU 2 determines whether a copy operation for one page has been completed. If the copy operation for one page has not been completed (NO in step S312), the CPU 2 repeats the processing in steps S305 through S312. Finally, the CPU 2 causes the recording mechanism 12 to execute a recording medium discharge operation (refer to step S313). Then, the CPU 2 terminates a memory storage copy operation for one page.

Referring back to FIG. 2, after the memory storage copy operation in step S105 is completed for a copy operation for the first sheet, the processing flow proceeds to step S106. In step S106, the CPU 2 determines whether the recording data storage (i.e., processing for storing recording data in the image memory 13) is successful by referring to the memory overflow flag. If the recording data storage is successful (YES in step S106), the CPU 2 executes a storage data record operation for the rest of required copies (refer to step S108).

Steps S107 and S109 are loop initialization and loop termination condition determination processing for repeating the processing in step S108 (i.e., the storage data record operation) n−1 times. Similarly, steps S115, S117, S119, and S121 are provided for later-described operations.

Figure 5:
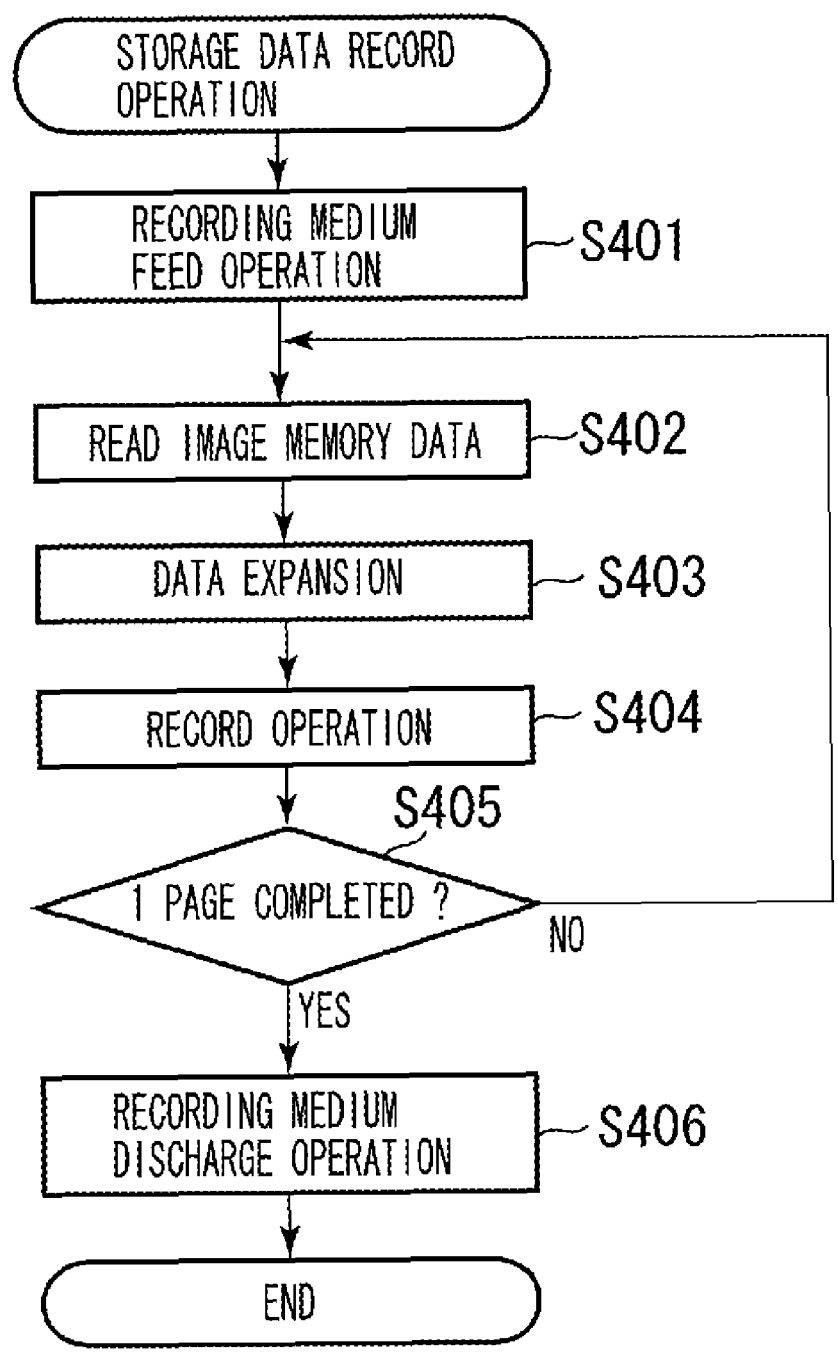
FIG. 5 is a flowchart illustrating an exemplary processing procedure for executing a storage data record operation of the image forming apparatus shown in FIG. 1 according to an embodiment of the present invention.

FIG. 5 is a flowchart illustrating an exemplary processing procedure for executing the storage data record operation (processing in step S108) of the image forming apparatus 1 according to an embodiment of the present invention. The storage data record operation includes processes of reading recording data from the image memory 13 and executing a record operation.

In FIG. 5, the CPU 2 instructs the record control section 11 to cause the recording mechanism 12 to execute a recording medium feed operation (refer to step S401).

Subsequently, in step S402, the CPU 2 reads compressed data from the image memory 13. In step S403, the CPU 2 performs processing for expanding the compressed data and stores the expanded data in the record buffer memory 10.

Next, in step S404, the CPU 2 transfers the recording data to the record control section 11 to start a record operation of the recording mechanism 12. Then, in step S405, the CPU 2 determines whether a record operation for one page has been completed. If the record operation for one page has not been completed (i.e., NO in step S405), the CPU 2 repeats the processing in steps S402 through S405. Finally, the CPU 2 causes the recording mechanism 12 to execute a recording medium discharge operation (refer to step S406). Then, the CPU 2 terminates a storage data record operation for one page.

Thus, in addition to a copy operation for the first sheet performed in step S105, the CPU 2 repeats the storage data record operation (i.e., processing in step S108) n−1 times in steps S107 through S109. As a result, a total of n copy operations for a requested document can be accomplished.

On the other hand, if the CPU 2 determines that the recording data storage is unsuccessful by referring to the memory overflow flag (i.e., NO in step S106), the CPU 2 determines, in steps S110 and S111, a copy operation for succeeding sheets based on the recording data amount Md counted in the copy operation for the first sheet.

In the present exemplary embodiment, the image scan/read processing and a recording data storage for a copy operation for the first sheet are simultaneously executed. Even if the image memory 13 is filled with recording data in a memory overflow state, the processing according to the present exemplary embodiment does not immediately stop the processing or does not resume the processing for repeatedly scanning/reading an image for each copy and recording the obtained image.

More specifically, the first exemplary embodiment includes a process of determining, by referring to the recording data amount Md counted in the copy operation for the first sheet, whether the memory storage is feasible if a read/storage operation and a record operation are separately executed. Furthermore, the first exemplary embodiment includes a process of separately executing the read/storage operation and the record operation (refer to steps S112 through S117) only when the memory storage is feasible.

Moreover, the first exemplary embodiment includes a process of repeatedly executing image scan/read and record processing only when the memory storage is unfeasible even if the memory storage operation and the record operation are separately executed (refer to steps S118 through S121).

First, in step S110, the CPU 2 obtains an entire memory capacity Mt usable as various buffer memories of the data memory 5, a memory capacity Ms required for a scan/read operation in the presently set copy mode, and a memory capacity Mp required for a record operation in the presently set copy mode. Then, the CPU 2 calculates a maximum memory capacity Mb (=Mt−max(Ms, Mp)) available for the image memory 13 that stores compressed image data. Next, in step S111, the CPU 2 determines whether a relationship Md≦Mb is established.

The formula expression max(p,q) in the above-described calculation represents obtaining a maximum value (larger one) between p and q. The determination in step S111 is required to check whether a memory storage operation and a record operation can be separately executed as described in steps S112 through S117.

Namely, when a read/memory storage operation and a record operation are separately executed, all of the memory area but the image memory 13 can be used as a read buffer or a record buffer during the storage operation. In short, the memory area occupied by the read buffer in a scan/read operation can be released and used as the record buffer in a record operation. Therefore, if a memory capacity comparable to a larger one of the read buffer (capacity Ms) and the record buffer (capacity Mp) is secured, the rest of the memory area can be used as the image memory 13 that stores compressed image data.

Accordingly, the maximum memory capacity Mb available for the image memory 13 can be obtained by subtracting max(Ms,Mp) from the entire memory capacity Mt (i.e., Mb=Mt−max(Ms,Mp)).

Accordingly, if the relationship Md≦Mb is established (i.e., YES in step S111), the processing flow proceeds to step S112 because a memory storage operation is feasible by separately executing a memory storage operation and a record operation. In step S112, the CPU 2 allocates the memory capacity Ms to the read buffer memory 8 and the memory capacity Mb to the image memory 13. Then, the processing flow proceeds to step S113. In step S113, the CPU 2 executes a memory storage operation.

Figure 6:
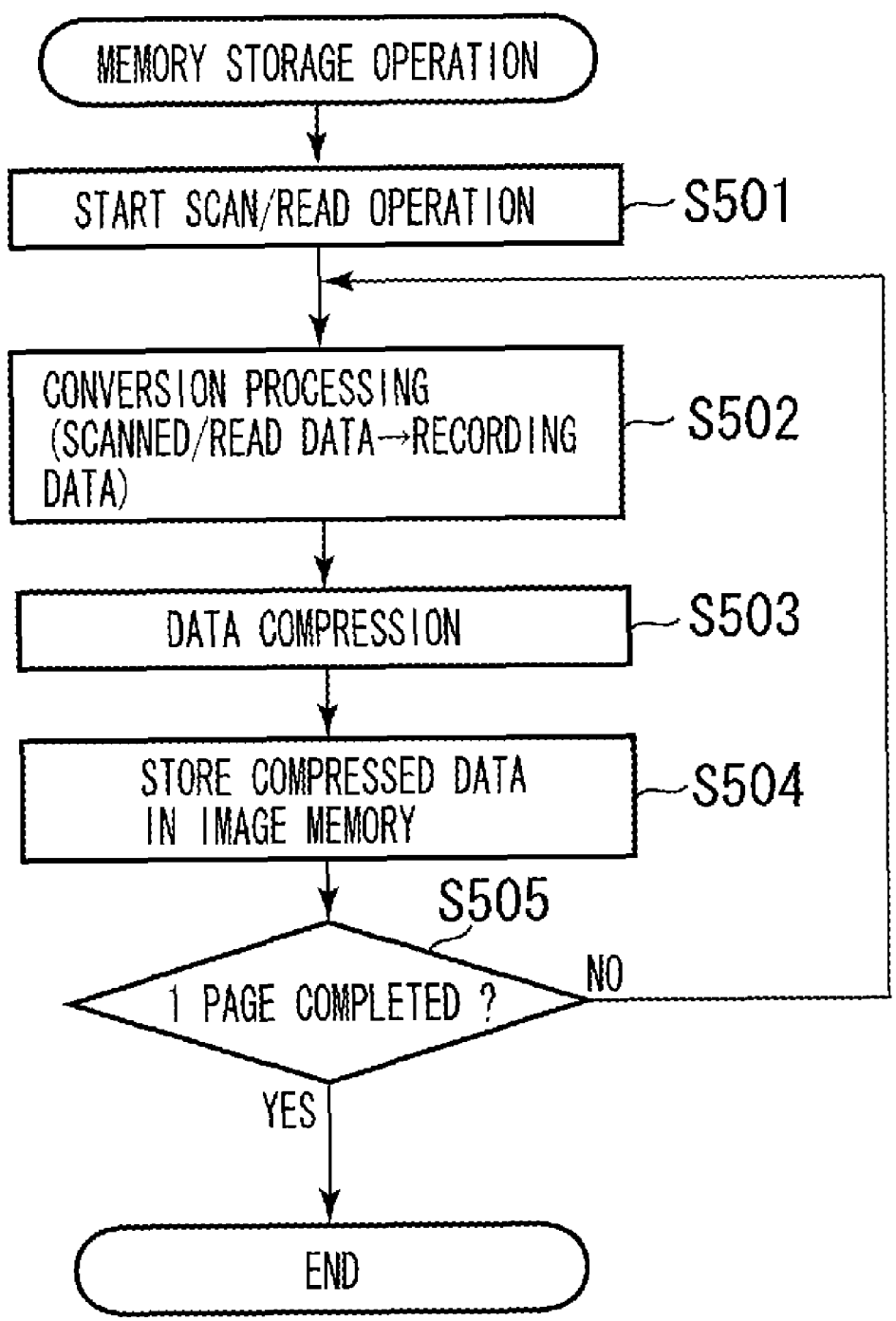
FIG. 6 is a flowchart illustrating an exemplary processing procedure for executing a memory storage operation of the image forming apparatus shown in FIG. 1 according to an embodiment of the present invention.

FIG. 6 is a flowchart illustrating an exemplary processing procedure for executing the memory storage operation (i.e., processing in step S113) of the image forming apparatus 1 according to an embodiment of the present invention. The memory storage operation includes a scan/read operation by the reading mechanism 7, a compression operation by the data conversion section 9 for compressing recording data, and storing the compressed recording data into the image memory 13.

In FIG. 6, the CPU 2 instructs the read control section 6 to start a scan/read operation by the reading mechanism 7 (refer to step S501). Subsequently, in step S502, the CPU 2 instructs the data conversion section 9 to successively input scanned/read data from the read buffer memory 8 and convert the input data into recording data. Then, the CPU 2 compresses the recording data (step S503) and stores the compressed data in the image memory 13 (step S504).

Then, in step S505, the CPU 2 determines whether a memory storage operation for one page has been completed. If the memory storage operation for one page has not been completed (i.e., NO in step S505), the CPU 2 repeats the processing in steps S502 through S505. If the memory storage operation for one page has been completed (i.e., YES in step S505), the CPU 2 terminates the memory storage operation.

Referring back to FIG. 2, after the memory storage operation in step S113 is completed, the processing flow proceeds to step S114. In step S114, the CPU 2 allocates the memory capacity Mp to the record buffer memory 10 and the memory capacity Mb to the image memory 13. The image memory 13 allocated in step S114 is the same in memory area and contents as the image memory 13 allocated in step S112.

Then, the processing flow proceeds to step S116 via step S115. In step S116, the CPU 2 executes a storage data record operation to record the recording data on the rest of requested sheets. The storage data record operation performed in step S116 is similar to that illustrated in FIG. 5. Thus, in addition to the copy operation for the first sheet performed in step S105, the CPU 2 repeats the storage data record operation (i.e., processing in step S116) n−1 times in steps S115 through S117. As a result, a total of n copy operations for a requested document can be accomplished.

On the other hand, if the relationship Md≦Mb is not established (i.e., NO in step S111), the processing flow proceeds to step S118. In step S118, the CPU 2 allocates the memory capacity Ms to the read buffer memory 8 and a residual memory capacity to the record buffer memory 10. Then, the processing flow proceeds to step S120 via step S119. In step S120, the CPU 2 executes a direct copy operation to record the recording data on the rest of requested sheets.

The direct copy operation performed in step S120 is similar to that illustrated in FIG. 3. In addition to the copy operation for the first sheet performed in step S105, the CPU 2 repeats the direct copy operation (i.e., processing in step S120) n−1 times in steps S119 through S121. As a result, a total of n copy operations for a requested document can be accomplished.

FIGS. 7A to 7C illustrate exemplary memory allocations according to the first exemplary embodiment. FIG. 7A illustrates a memory allocation during a direct copy operation according to an embodiment of the present invention. According to the example shown in FIG. 7A, a memory capacity Ms required for a scan/read operation in a presently set copy mode is allocated to the read buffer memory 8 and a residual memory capacity is allocated to the record buffer memory 10.

FIG. 7B illustrates a memory allocation during a memory storage copy operation in a situation where storage of recording data for one page is successful. According to the example shown in FIG. 7B, a memory capacity Ms required for a scan/read operation in a presently set copy mode is allocated to the read buffer memory 8, a memory capacity Mp required for a record operation in the presently set copy mode is allocated to the record buffer memory 10, and a residual capacity (Mb) is allocated to the image memory 13.

If in FIG. 7B the capacity Mb for the image memory 13 is insufficient for storing the recording data amount (Md), a memory allocation such as the one shown in FIG. 7C can be used.

Namely, FIG. 7C illustrates a memory allocation in a situation where storage of recording data for one page is unsuccessful during a memory storage copy operation but the memory storage is feasible if a memory storage operation and a record operation are separately executed.

First, a memory storage operation is executed. In this case, as illustrated in the left part of FIG. 7C, a memory capacity Ms is allocated to the read buffer memory 8 and a memory capacity Mb is allocated to the image memory 13. After completing the memory storage operation, the memory allocation is changed to the pattern shown in the right part of FIG. 7C.

According to the memory allocation shown in the right part of FIG. 7C, a memory capacity Mp is allocated to the record buffer memory 10 and a memory capacity Mb is allocated to the image memory 13. The image memory 13 allocated in the record operation is the same in memory area and contents as the image memory 13 allocated in the memory storage operation.

As described above, in a copy operation for the first sheet of requested sheets for a one-page document, the first exemplary embodiment reads/scans a document image and converts the document image data into recording data. Then, the first exemplary embodiment stores the recording data in an image memory and counts a data amount of the recording data to be stored in the image memory.

If all of the recording data for one page can be stored in the image memory when the copy operation for the first sheet is completed, the first exemplary embodiment executes a first residual sheet record operation for successively recording succeeding sheets based on the recording data stored in the image memory.

If, when the copy operation for the first sheet is completed, all of the recording data for one page cannot be stored in the image memory and the counted data amount of the recording data is equal to or smaller than an available storage capacity of the image memory on condition that a read/storage operation and a record operation are separately executed, the first exemplary embodiment performs a second residual sheet record operation. The second residual sheet record operation includes processes of scanning/reading a document image and storing produced recording data in the image memory and, after storage is completed, recording the recording data.

If, when the copy operation for the first sheet is completed, all of the recording data for one page cannot be stored in the image memory and the counted data amount of the recording data exceeds an available storage capacity of the image memory on condition that a read/storage operation and a record operation are separately executed, the first exemplary embodiment performs a third residual sheet record operation for repeatedly scanning/reading a document image and printing recording data for each of residual sheets.

Namely, the first exemplary embodiment counts a data amount of recording data obtained in a copy operation for the first sheet and determines a copy operation method for succeeding sheets according to the counted data amount. Accordingly, the total copy time can be reduced even when recording data for one page cannot be stored in an image memory.

In particular, even if a reading mechanism and a recording mechanism have higher resolutions, or even if a memory capacity of an apparatus is reduced, the first exemplary embodiment can realize expected higher performances of the apparatus.

According to the systems discussed in Japanese Patent Application Laid-Open No. 11-331457 and Japanese Patent Application Laid-Open No. 2003-087467, consideration to memory allocation and reading/recording resources is insufficient. Therefore, the conventional system may stop a succeeding copy operation for residual sheets or unnecessarily repeat a scan/read operation for the copy operation of each succeeding sheet even if the system has sufficient capability. The first exemplary embodiment can solve these drawbacks.

In the first exemplary embodiment, FIGS. 3 through 6 illustrate an integrated flowchart applied to a single control system including the CPU 2. However, the effects of the first exemplary embodiment can be similarly obtained in a multi-task environment wherein the scan/read operation, the data conversion processing, the data compression processing, the memory storage processing, and the record operation are executed as independent tasks.

Moreover, the effects of the first exemplary embodiment can be similarly realized in a multi-CPU environment wherein each processing can be controlled by an independent CPU.

Second Exemplary Embodiment

Figure 8:
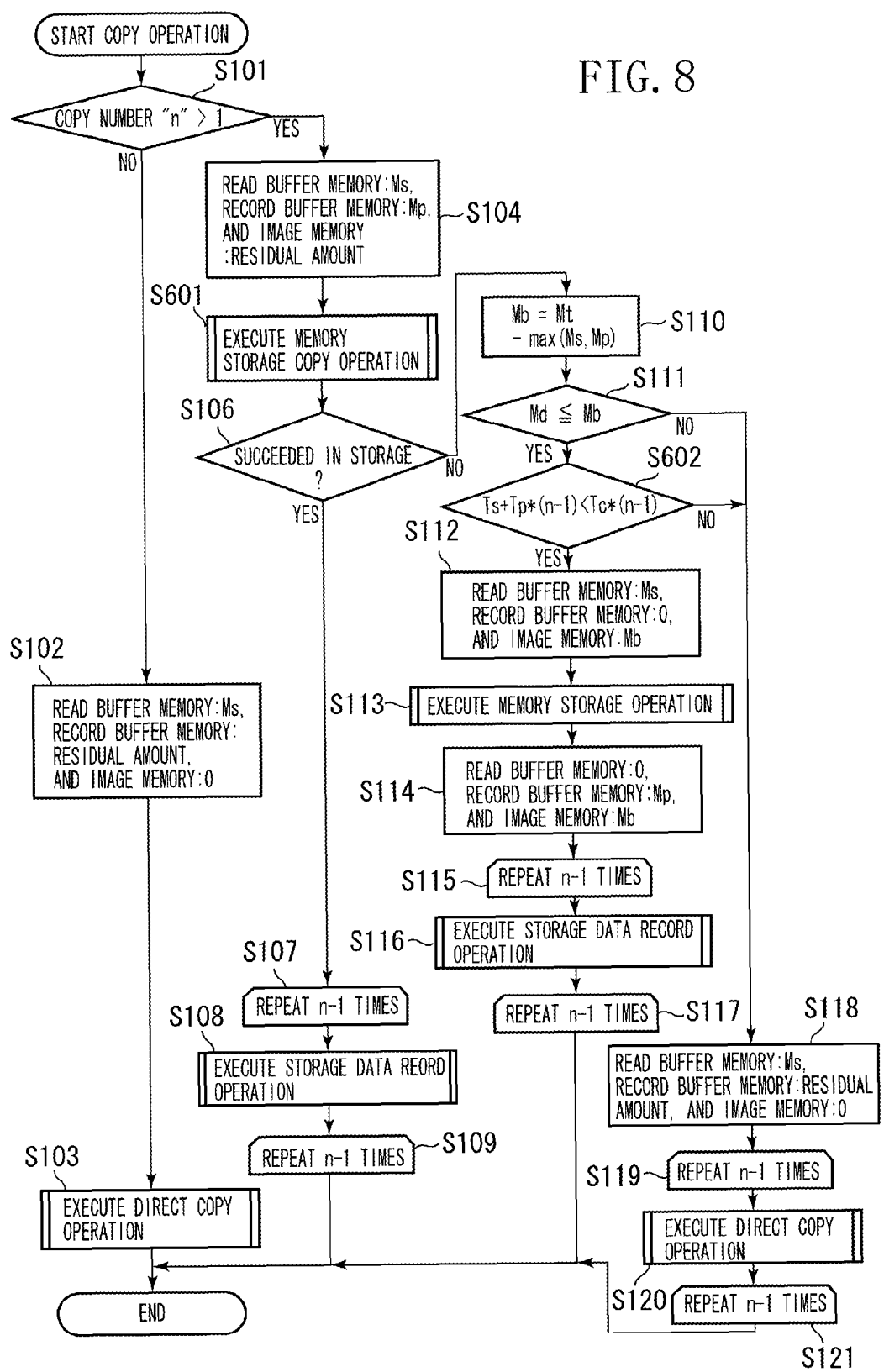
FIG. 8 is a flowchart illustrating another exemplary processing procedure for executing a copy operation of the image forming apparatus shown in FIG. 1 according to an embodiment of the present invention.

FIG. 8 is a flowchart illustrating another exemplary processing procedure for executing a copy operation of the image forming apparatus 1 according to a second exemplary embodiment.

The second exemplary embodiment is different from the first exemplary embodiment in the following points. The second exemplary embodiment measures a time required for a scan/read operation performed by the reading mechanism 7 and a time required for a record operation performed by the recording mechanism 12 in a memory storage copy operation for the first sheet of requested plural sheets.

Then, if the recording data storage is unsuccessful in a memory storage copy operation for the first sheet, the second exemplary embodiment determines whether the memory storage is feasible if a memory storage operation and a record operation are separately executed based on the recording data amount counted in the memory storage copy operation for the first sheet.

Then, if it is determined that the memory storage is feasible if a memory storage operation and a record operation are separately executed, the second exemplary embodiment calculates a time required for a succeeding copy operation for residual sheets based on the obtained times required for the scan/read operation and the record operation. Then, the second exemplary embodiment determines whether separately executing a memory storage operation and a record operation can be accomplished in a short time compared to repeatedly executing a direct copy operation.

FIG. 8 includes processing contents similar to those illustrated in FIG. 2. Therefore, the second exemplary embodiment describes only the different portions and uses the same step numbers to indicate the steps similar to those shown in FIG. 2.

If the CPU 2 determines that the copy number "n" of required copies is not 1, i.e., when the number in the copy settings is plural (YES in step S101), the processing flow proceeds to step S104. In step S104, the CPU 2 allocates a memory capacity Ms of the data memory 5 to the read buffer memory 8. As described above, the memory capacity Ms is equal to a memory capacity required for a scan/read operation in a presently set copy mode.

Similarly, the CPU 2 allocates a memory capacity Mp of the data memory 5 to the record buffer memory 10. The memory capacity Mp is equal to a memory capacity required for a record operation in the presently set copy mode. Furthermore, the CPU 2 allocates a residual memory capacity of the data memory 5 to the image memory 13. Then, the processing flow proceeds to step S601. In step S601, the CPU 2 executes a memory storage copy operation.

Figure 9:
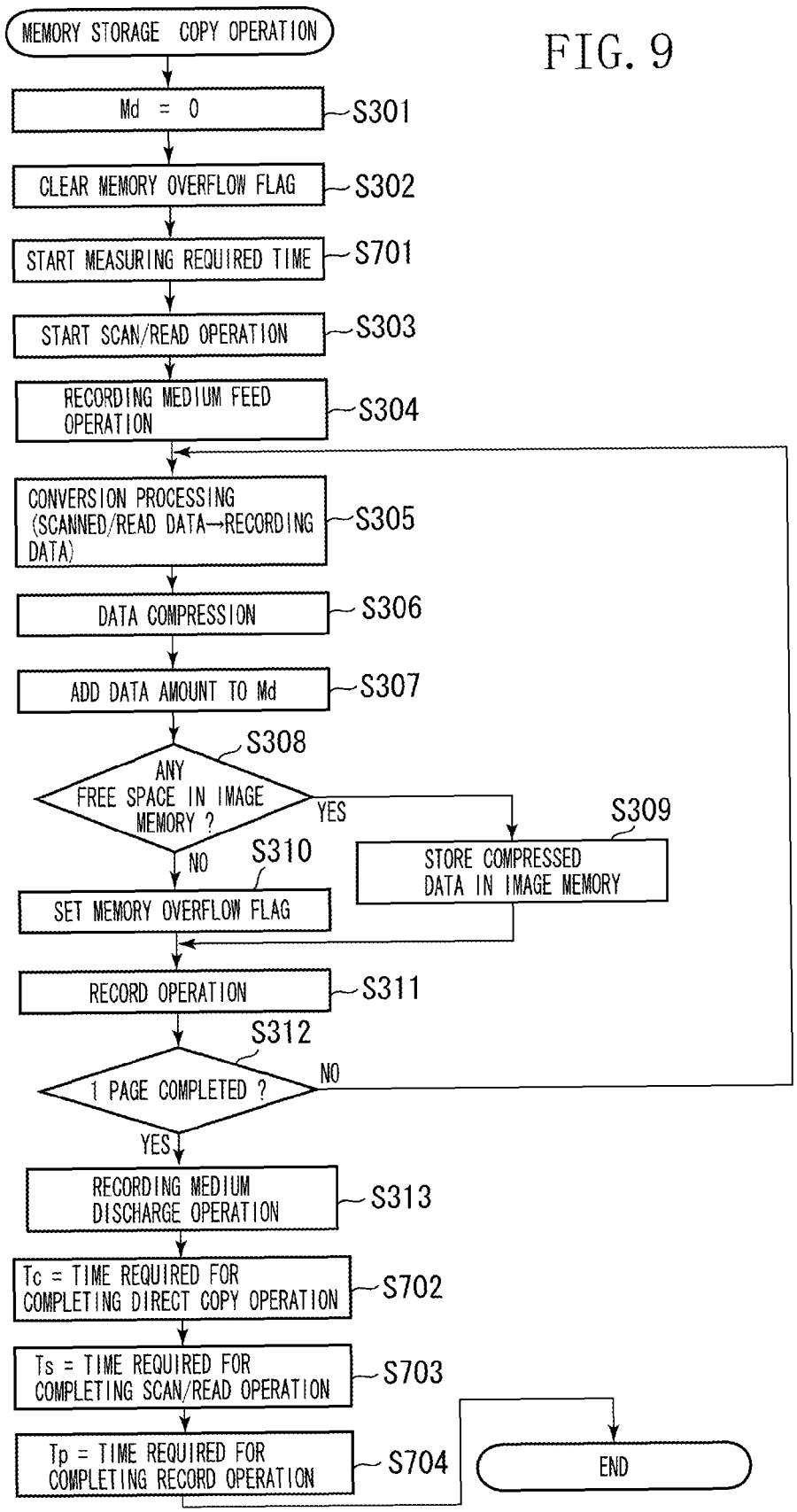
FIG. 9 is a flowchart illustrating another exemplary processing procedure for executing a memory storage copy operation of the image forming apparatus shown in FIG. 1 according to an embodiment of the present invention.

FIG. 9 is a flowchart illustrating an exemplary processing procedure for executing the memory storage copy operation (i.e., processing in step S601) of the image forming apparatus 1 according to an embodiment of the present invention. FIG. 9 includes processing contents similar to those illustrated in FIG. 4. Therefore, the second exemplary embodiment describes only the different portions and uses the same step numbers to indicate the steps similar to those shown in FIG. 4.

Before starting the memory storage copy operation, the CPU 2 clears the data amount Md counting the recording data (refer to step S301) and clears the memory overflow flag (refer to step S302). Then, the CPU 2 starts measuring a required time (refer to step S701). In the processing illustrated in FIG. 9, the CPU 2 measures three types of required times Tc, Ts, and Tp.

More specifically, after the memory storage copy operation is completed, the CPU 2 measures the time Tc between start of a scan/read operation and termination of a record operation and stores the measured time TC as a time required for a direct copy operation performed by the reading mechanism 7 and the recording mechanism 12 (refer to step S702).

Furthermore, the CPU 2 measures the time Ts between start of the scan/read operation and termination of the scan/read operation and stores the measured time Ts as a time required for completing an operation of the reading mechanism 7 (refer to step S703). Then, the CPU 2 measures the time Tp between start of a recording medium feed operation and termination of a recording medium discharge operation and stores the measured time Tp as a time required for completing an operation of the recording mechanism 12 (refer to step S704).

As described above, the required times Ts and Tp can be obtained by measuring a time between start of a scan/read operation and termination of the scan/read operation and a time between start of a record operation and termination of the record operation.

If a read control task and a record control task are executed in a time division fashion, the CPU 2 can accumulate the length of the read control task and the length of the record control task to accurately measure the times Ts and Tp.

If the memory storage is unsuccessful in step S106 of FIG. 8 and the relationship Md≦Mb is satisfied in step S111, namely when the CPU 2 determines that the memory storage is feasible if the memory storage operation and the record operation are separately executed, the processing flow proceeds to step S602.

In step S602, the CPU 2 determines whether the following formula (1) is satisfied based on time information of respective operations measured in the memory storage copy operation and stored in steps S702 through S704. Namely, the CPU 2 checks whether separately executing a memory storage operation and a record operation can be accomplished in a short time compared to repeatedly executing a direct copy operation.

$$Ts+Tp*(n-1)<Tc*(n-1) \quad (1)$$

If the formula (1) is satisfied (YES in step S602), i.e., when separately executing a memory storage operation and a record operation can reduce the required time, the processing flow proceeds to step S112.

On the other hand, if the formula (1) is not satisfied (NO in step S602), i.e., when repeatedly executing a direct copy operation can reduce the required time, the processing flow proceeds to step S118.

As described above, if, when the copy operation for the first sheet is completed, all of the recording data for one page cannot be stored in the image memory and the counted data amount of the recording data is equal to or smaller than an available storage capacity of the image memory on condition that a read/storage operation and a record operation are separately executed, the second exemplary embodiment executes a residual sheet record operation which includes a process of separately executing a read operation and a record operation or repeatedly executing a read operation and a record operation for each sheet, whichever requires a shorter time for execution.

Namely, the second exemplary embodiment obtains a data amount of recording data and required times for a scan/read operation and a record operation in a copy operation for the first sheet and then determines a copy operation method for succeeding sheets based on the obtained data amount and the required times. Accordingly, even if storing recording data for one page is unsuccessful, the second exemplary embodiment can control the copy operation so as to minimize a copy time required for succeeding sheets.

Furthermore, software program code for realizing the functions of the above-described exemplary embodiments can be supplied to a system or an apparatus connected to various devices. A computer (or CPU or micro-processing unit (MPU)) in the system or the apparatus can execute the program to operate the devices to realize the functions of the above-described exemplary embodiments. Accordingly, the present invention encompasses the program code installable in a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying the program code to a computer, such as a storage (or recording) medium storing the program code. In this case, the type of program can be any one of object code, interpreter program, and OS script data. A storage medium supplying the program can be selected from any one of a flexible (floppy) disk, a hard disk, an optical disk, a magneto-optical (MO) disk, a compact disk-ROM (CD-ROM), a CD-recordable (CD-R), a CD-rewritable (CD-RW), a magnetic tape, a non-volatile memory card, a ROM, and a DVD (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses WWW servers that allow numerous users to download the program files so that the functions or processes of the present invention can be realized on their computers.

Furthermore, enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a page on the Internet. The users can decipher the programs with the obtained key information and can install the programs on their computers. When the computer reads and executes the installed programs, the functions of the above-described exemplary embodiments can be realized.

Furthermore, an operating system (OS) or other application software running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-035917 filed Feb. 14, 2006, which is hereby incorporated by reference herein in its entirety.

What is claimed is:

1. An image processing apparatus comprising:
an acquiring unit configured to acquire read data corresponding to a part of an original, the read data being obtained by a reading apparatus reading a part of the original sequentially;
a storage unit in which a memory area of a read buffer, an image memory, or a record buffer can be allocated, the read buffer being configured to store the read data corresponding to a part of the original acquired by the acquiring unit;
and the record buffer being configured to store recording data based on the read data stored in the read buffer, the image memory being configured to store image data corresponding to the original;

a storing control unit configured to store image data corresponding to the original into the image memory, based on a plurality of the read data sequentially stored in the read buffer;

a generating unit configured to generate recording data based on image data retrieved from the image memory, and to store the generated recording data into the record buffer;

a recording control unit configured to cause a recording apparatus to record an image corresponding to the original based on the recording data stored in the record buffer;

a determining unit configured to determine a data amount of image data corresponding to the original to be stored in the image memory based on the read data stored in the read buffer; and a control unit configured to, according to the data amount determined by the determining unit, allocate a memory area of the storage unit which was allocated as the read buffer when image data is stored into the image memory by the storing unit as the record buffer in response to completion of storing of image data corresponding to the original into the image memory by the storing control unit;

wherein the generating unit stores recording data into the record buffer allocated by the control unit, and the recording control unit causes the recording apparatus to record an image based on the recoding data stored in the record buffer.

2. The image processing apparatus according to claim 1, wherein the memory capacity of the image memory obtained by allocating the memory area by the control unit is the difference between the memory capacity of the storage unit and the memory capacity of one of the read buffer or the record buffer.

3. The image processing apparatus according to claim 1, wherein the storing control unit stores image data into the image memory by compressing the read data stored in the read buffer, and the generating unit generates recording data by expanding the compressed image data stored in the image memory.

4. The image processing apparatus according to claim 1, further comprising a second determining unit configured to determine whether the amount of image data determined by the determining unit exceeds a memory capacity of an image memory obtained by allocating the memory area by the control unit, wherein when the second determining unit determines that the amount of image data determined by the determining unit is lower than the memory capacity, the storing control unit stores image data corresponding to the original in the image memory.

5. The image processing apparatus according to claim 4, wherein when the second determining unit determines that the amount of image data determined by the determining unit exceeds the memory capacity, the recording control unit causes the recording apparatus to record the second image based on recording data directly generated from the read data stored in the read buffer.

6. The image processing apparatus according to claim 1, when a copy operation for printing a plurality of images corresponding to the same original, the recording control unit causes the recording apparatus to record a first image corresponding to the original based on recording data directly generated from the read data stored in the read buffer, and to record a second image corresponding to the original based on the recording data generated by the generating unit based on image data stored in the image memory.

7. The image processing apparatus according to claim 6 wherein, when the recording control unit causes the recording apparatus to record a first image corresponding to the original, the determining unit determines the amount of image data corresponding to the while of the original.

8. The image processing apparatus according to claim 7, wherein in printing the second image, an image memory having a memory capacity corresponding to the amount of image data determined by the determining unit is allocated.

9. The image processing apparatus according to claim 8, wherein the control unit allocates the record buffer corresponding to the printing of the second image in response to completion of the storing of image data by the storage unit into the image memory allocated in the printing of the second image.

10. A method for controlling an image processing apparatus comprising a storage unit in which a memory area of a read buffer, an image memory, or a record buffer can be allocated, the method comprising:

acquiring generate read data corresponding to a part of an original, the read data being obtained by a read apparatus reading a part of the original sequentially and storing the read data into the read buffer;

storing image data corresponding to the original into the image memory, based on a plurality of the read data sequentially stored in the read buffer;

generating recording data based on image data retrieved from the image memory, and storing the generated recording data into the record buffer causing a recording apparatus to record an image corresponding to the original based on the recording data stored in the record buffer; and determining a data amount of image data corresponding to the original to be stored into the image memory based on the read data stored in the read buffer;

according to the determined data amount, allocating a memory area of the storage unit which was allocated as the read buffer when image data is stored into the image memory as the record buffer in response to completion of storing of image data corresponding to the original into the image memory;

wherein the recording data generated based on image data retrieved from the image memory is stored in the record buffer allocated in response to the completion of the storing of image data corresponding to the original into the image memory, and based on the recording data stored in the record buffer, an image is recorded by the recording apparatus.

11. A non-transitory computer-readable storage medium containing computer-executable program for controlling an image processing apparatus according to claim 1.

* * * * *